US012625847B2

(12) United States Patent
Abbigeri et al.

(10) Patent No.: US 12,625,847 B2
(45) Date of Patent: May 12, 2026

(54) DELETION OF AUDIT TRAIL FILES BASED ON A DATABASE

(71) Applicant: Dell Products L.P., Round Rock, TX (US)

(72) Inventors: Shivaraj Abbigeri, Navalgund (IN); Ban Wang, Burlington (CA); Harini H S, Bangalore (IM); Elango Chockalingam, Bangalore (IN); Navneet Upadhyay, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/926,089

(22) Filed: Oct. 24, 2024

(65) Prior Publication Data

US 2026/0119452 A1    Apr. 30, 2026

(51) Int. Cl.
*G06F 16/16* (2019.01)
*G06F 16/11* (2019.01)

(52) U.S. Cl.
CPC .......... *G06F 16/162* (2019.01); *G06F 16/125* (2019.01)

(58) Field of Classification Search
CPC .... G06F 16/162; G06F 16/125; G06F 16/245; G06F 16/654
USPC .......................................... 707/609; 713/165
See application file for complete search history.

(56) References Cited

U.S. PATENT DOCUMENTS

| | | | | |
|---|---|---|---|---|
| 7,200,777 B1* | 4/2007 | Bouchee | ............. | G06F 11/1469 714/45 |
| 2011/0055559 A1* | 3/2011 | Li | ........................ | G06F 21/6218 380/259 |
| 2012/0089575 A1* | 4/2012 | Kerns | ................. | G06F 16/1734 707/687 |
| 2016/0110265 A1* | 4/2016 | Athani | .................. | G06F 16/245 707/654 |

* cited by examiner

*Primary Examiner* — Shahid A Alam
(74) *Attorney, Agent, or Firm* — Chamberlain, Hrdlicka, White, Williams & Aughtry; Aly Z. Dossa

(57) ABSTRACT

In general, certain embodiments described herein relate to a method for managing and deletion of audit trail files on a database created by a backup system. The method includes setting up a retention policy for backup system audit trail files. The audit trail files include the backup system audit trail files and other audit trail files. After setting up the retention policy, the method includes making a first determination that a first audit trail file is a backup system audit trail file, making a second determination, based on the first determination, that an age of the first audit trail file is passed a time period specified in the retention policy, and making a third determination, based on the second determination, that no retention policy exclusion applies to the first audit trail file. Finally based on the third determination, the first audit trail file is deleted from the database.

17 Claims, 3 Drawing Sheets

DELETION OF AUDIT TRAIL FILES BASED ON A DATABASE

BACKGROUND

Applications may be executed to run tasks on databases creating data. The data generated by the applications may be backed up to a secondary system. The backup of data on databases creates audit trail files logging a backup systems interactions with the database. These audit trail files are stored on the database and can significantly inflate the database memory usage over time. This leads to inefficient memory utilization, which is typically manifested as a performance impairment of the databases.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
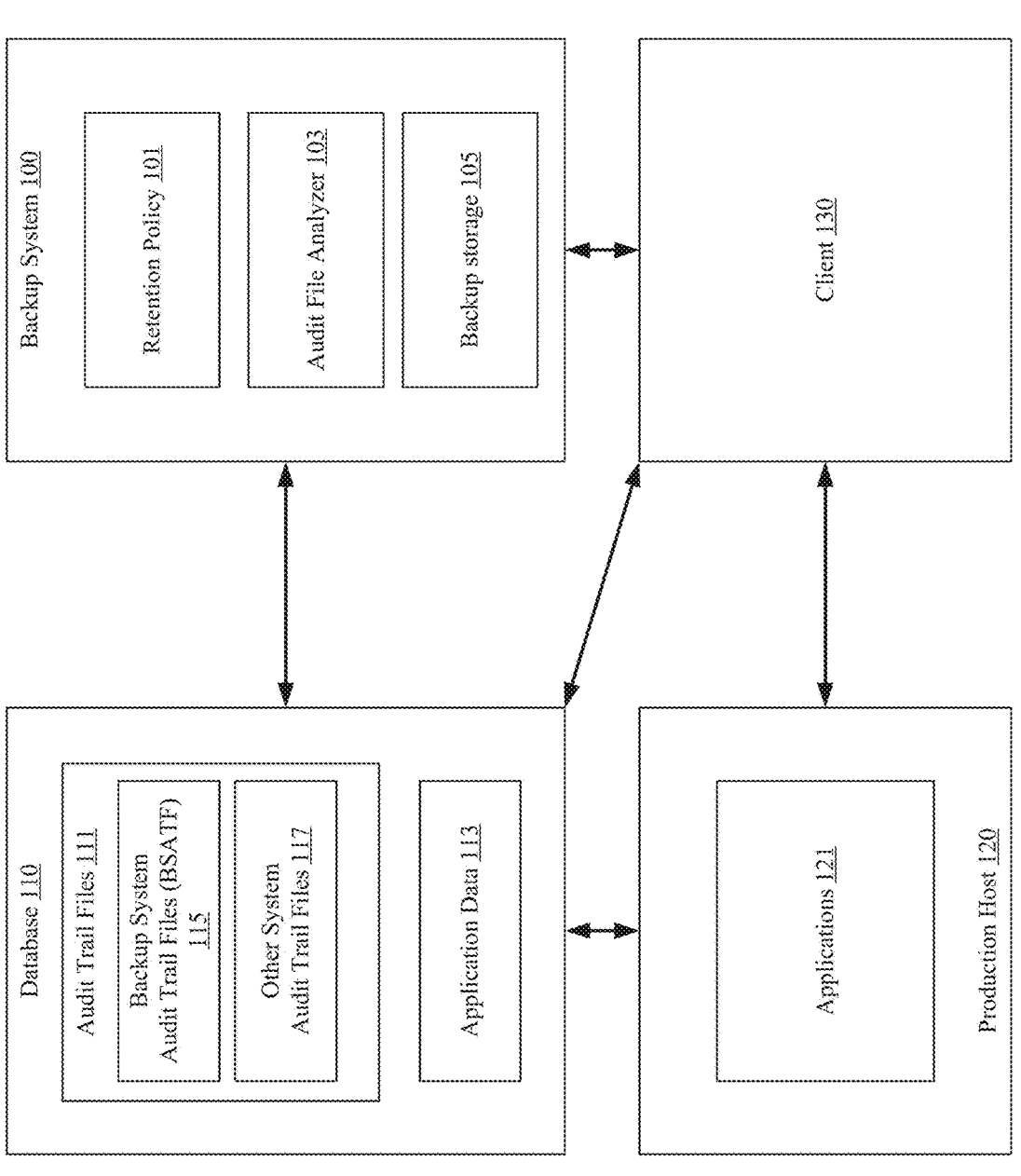
FIG. 1 shows a system in accordance with one or more embodiments of the invention.

The backup system is used by a user of a database to assist in operation of the database. The backup system of the database may provide software defined data protection, automated discovery, and deduplication in creating backups. The backup service supports compliance service level objectives of the database including backups of application data, file system data, virtual machines, hypervisors etc. In addition, the backup system generates audit trail files on the database in the course of its operation. The audit trail files are generated at commencement of a session of the backup system on the database and at the closure of the session. The audit trail files are critical for monitoring actions taken on the database and database operations.

Traditionally, the database does not manage the audit trail files created by the sessions with the backup system. Said another way, the audit trail files are not automatically deleted from, or archived off, the database. Accumulation of these audit trail files can lead to decreased performance, reduced efficiency, and system instability on the database. As the number of audit trail files grows the system memory of the database, usage increases. Each audit trail file occupies a certain amount of memory space in the database. When the system memory is filled with the audit trail files, the database must work harder to manage the data, leading to slower response times and decreased performance. The efficiency of the database is decreased causing backup operations may take longer. Further, increase in the amount of data on the database, causes an increase in time for the backup operation. Similarly, database scans or searches may be slower because of all the extra files to sift. If the memory usage becomes too high, the database will experience system instability or even crashes. This is because the database might run out of memory resources, causing it to behave unpredictably or stop working altogether.

To address one or more of the aforementioned issues, embodiments of the invention relate to a method for managing and deletion of audit trail files created by a backup system on a database. The method optimizes memory usage and bolsters system performance. In addition, the method operates in tandem with functions of the database, offering a seamless integration that minimizes disruption to ongoing operations. The database may be continuously monitored for the generation of new audit trail files. Upon detection, the backup system identifies backup system created audit trail files using a unique signature and deletes them based on a set retention period. This approach provides efficient memory utilization, enhancing the overall system performance while maintaining the integrity of the auditing process. This approach ensures seamless database operations while minimizing disruptions.

Accordingly, in accordance with one or more embodiments of the invention, the method of managing and deletion of the audit trail files reduces the issues caused by the audit trail files. The method may lead to increased performance, increased efficiency, and a minimization of system instability on the database. By implementing one or embodiments disclosed here, the backup system manages the accumulation of audit trail files, optimizing system memory usage, enhancing system performance, and improving the overall efficiency of database operations. This approach strikes a balance between maintaining necessary audit trails for a reasonable period and preventing undue strain on system resources.

The following describes one or more embodiments.

FIG. 1 shows a system in accordance with one or more embodiments of the invention. The system may include a backup system (100), a database (110), a production host (120), and a client (130). Each component may be operatively connected to any of the other components via any combination of wired and/or wireless connections. Each component illustrated in FIG. 1 is discussed below. Further, the aforementioned components may communicate over a network (not shown). In one or more embodiments, the network may be a local area network (LAN), a wide area network (WAN) such as the Internet, a mobile network, any other network type, or a combination thereof. Further, the network may encompass various interconnected, network-enabled subcomponents (or systems) (e.g., switches, routers, gateways, etc.) that may facilitate communications between the aforementioned components. Moreover, the aforementioned components may communicate with one another over the network using any combination of wired and/or wireless communication protocols. The system may include additional, fewer, and/or different components without departing from the invention.

Turning to the backup system (100), the backup system (100) may include a retention policy (101), an audit trail file analyzer (103), and backup storage (105). The backup system (100) is operatively connected to the database (110) and the client (130). The backup system (100) includes functionality for backing up data from the database (110). The backup system (100) stores backups in the backup storage (105). The backups can be generated on a schedule or upon request of the client (130). Backing up data in the database creates audit trail files (111) discussed below. The backup system (100) houses the retention policy (101) for managing the audit trail files (111) in the database (110). The retention policy may be set by the client (130) and is discussed further below. The audit trail file analyzer (103)

includes functionality to analyze audit trail files to determine information about the audit trail files (e.g., origin, age, contents, etc.).

The retention policy (101) specifies when a backup system audit trail files (BSATF) (115) can be deleted off the database (110). The retention policy (101) does not apply to other audit trail files (117). The retention policy (101) balances the need to have audit trail files for reference to operations performed on the database (110) with the system memory usage of the database (110). The retention policy (101) may specify a time period for how long BSATF (115) should be kept on the database (110). The time period is selected with consideration to the memory availability of the database (110). The time period may be set by the user via the client (130). The time period may be customized to meet the specific needs and regulatory requirements of the user. This ensures that the user remains compliant with applicable data retention laws while effectively managing system resources of the database. The retention policy (101) may also include retention policy exclusions for when a BSATF (115) should be kept on the database (110) longer that the time period. The retention policy exclusions may include an error being captured in the BSATF (115), the BSATF (115) being associated with an active process in the applications (121), the BSATF being associated with a process requiring records be kept longer than the time period, and other similar reasons. The retention policy exclusions may be set by the user via the client (130).

Figure 2:
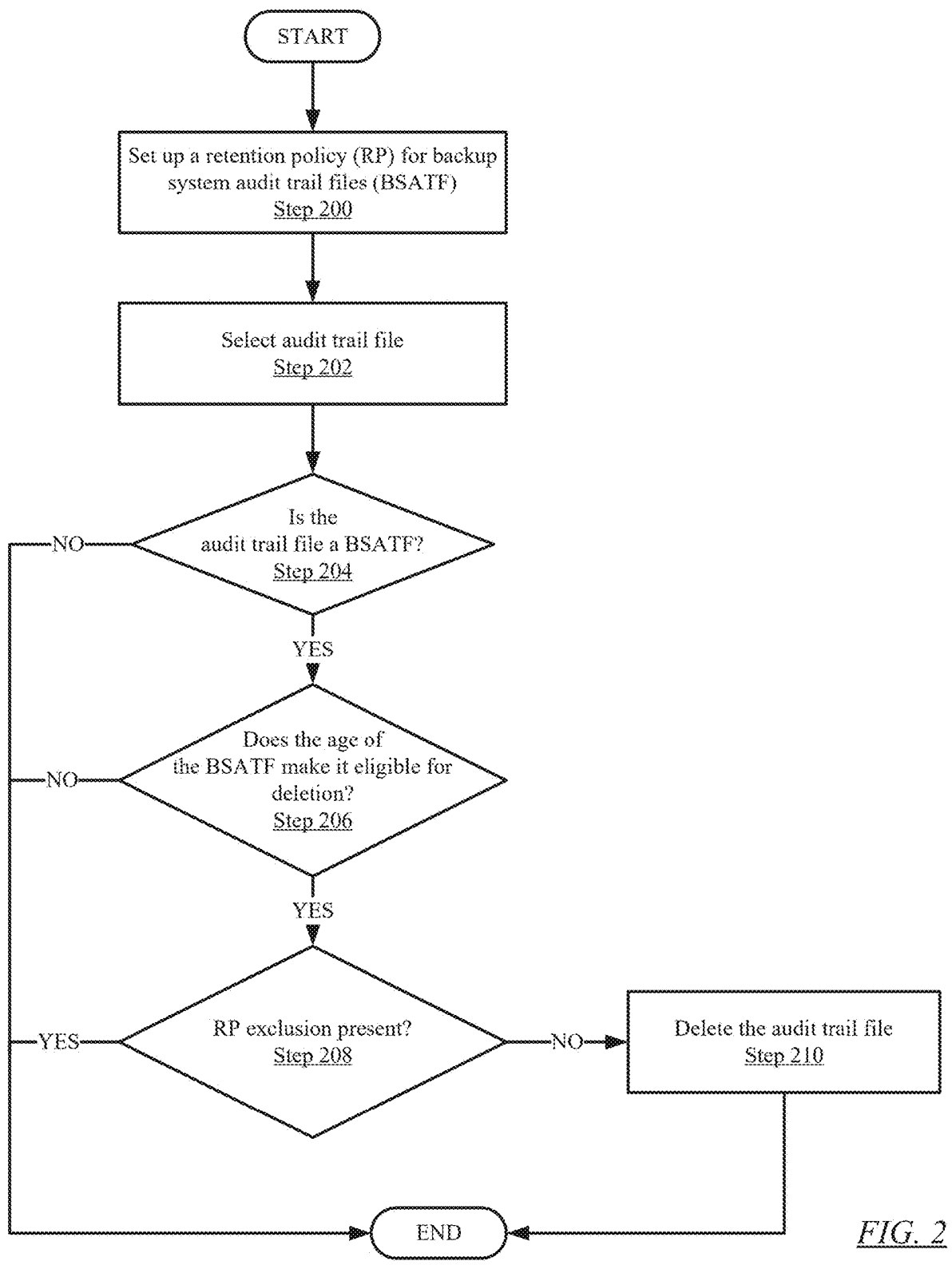
FIG. 2 shows a flowchart of a method for managing audit trail files in accordance with one or more embodiments of the invention.
Figure 3:
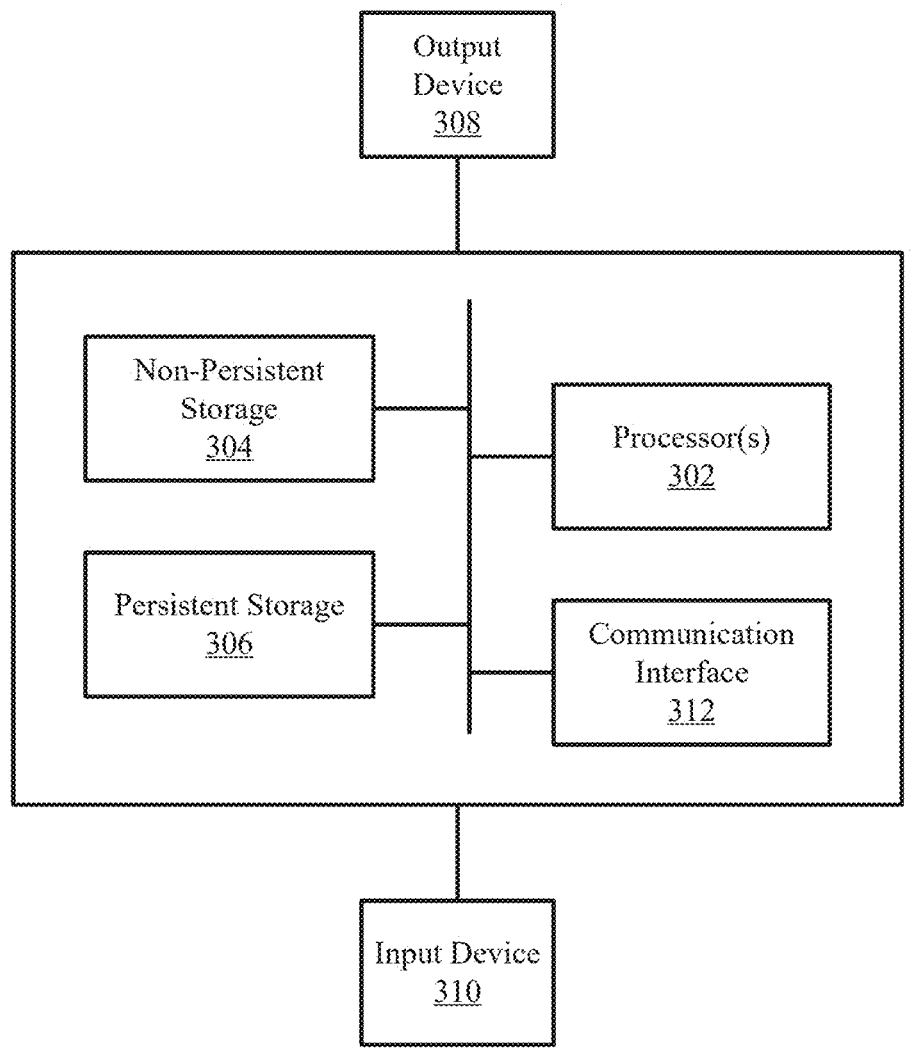
FIG. 3 shows a diagram of a computing device in accordance with one or more embodiments of the invention.

In one or more embodiments of the invention, the backup system (100) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of backup system (100) described throughout this application and/or all, or a portion thereof, of the methods illustrated in FIG. 2.

In one or more embodiments of the invention, the backup system (100) is implemented as a logical device. The logical device may utilize the computing resources of any number of computing devices and thereby provide the functionality of the backup system (100) described throughout this application and/or all, or a portion thereof, of the methods illustrated in FIG. 2.

Turning to the database (110), the database (110) may include audit trail files (111) and application data (113). The database (110) includes a data structure that stores the application data (113). The audit trail files (111) are created to log actions that are performed on the database (110). The audit trail files (111) are stored on the database (110). The audit trail files (111) include the BSATF (115) and the other system audit trail files (117). The BSATF (115) are formed in response to actions the backup system (100) performs on the database (110). The other audit trail files (117) are formed in response to actions by the database (110) and by other systems such as the production host (120). The application data (113) is data stored on the database (110) as directed by the production host (120). The database is operatively connected to the production host (120) and the client (130).

In one or more embodiments of the invention, the database (110) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the database (110) described throughout this application and/or all, or a portion thereof, of the methods illustrated in FIG. 2.

In one or more embodiments of the invention, the database (110) is implemented as a logical device. The logical device may utilize the computing resources of any number of computing devices and thereby provide the functionality of the database (110) described throughout this application and/or all, or a portion thereof, of the methods illustrated in FIG. 2.

Turning to the production host (120), the production host (120) may include applications (121). These applications (121) may include one or more applications. The applications (121) may be logical entities executed using computing resources (not shown) of the production host (120). Each of the applications (121) may be performing similar or different processes. In one or more embodiments of the invention, the applications (121) provide software services for the client (130). The applications (121) interact with the database. In one or more embodiments, the applications (121) may utilize a file system to manage the storage of data on the database (110). In one or more embodiments of the invention, a file system is an organizational data structure that tracks how data is stored and retrieved in a system. The file system may specify references to files and any data blocks associated with each file. Each data block may include a portion of application data for an application. In one or more embodiments, the file data, application data, and/or other data utilized by the applications (121) are stored on the database (110) in the application data (113). The aforementioned data is accessed by the applications (121) through the connection between the database (110) and the production host (120).

In one or more embodiments of the invention, the production host (120) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the production host (120) described throughout this application and/or all, or a portion thereof, of the methods illustrated in FIG. 2.

In one or more embodiments of the invention, the production host (120) is implemented as a logical device. The logical device may utilize the computing resources of any number of computing devices and thereby provide the functionality of the production host (120) described throughout this application and/or all, or a portion thereof, of the methods illustrated in FIG. 2.

Turning to the client (130), the client (130) is used by a user to access the production host (120), the backup system (100), and the database (110). The client is operatively connected to the production host (120). In one or more embodiments of the invention, the applications (121) provide services to the client (130). The client is operatively connected to the database (110) to access the application data (113). The client is operatively connected to the backup system (100) to access the backups in the backup storage (105) and make changes to the retention policy (101).

In one or more embodiments of the invention, the client (130) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the client (130) described throughout this application and/or all, or a portion thereof, of the methods illustrated in FIG. 2.

In one or more embodiments of the invention, the client (130) is implemented as a logical device. The logical device may utilize the computing resources of any number of computing devices and thereby provide the functionality of the client (130) described throughout this application and/or all, or a portion thereof, of the methods illustrated in FIG. 2.

FIG. 2 shows a flowchart of a method for managing audit trail files on a database. The method of FIG. 2 may be performed by, for example, the backup system (e.g., 100, FIG. 1). Other components of the system of FIG. 1 may perform all, or a portion, of the method of FIG. 2 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

Turning to FIG. 2, in step 200, a retention policy for backup system audit trail files is set up. The retention policy may be the retention policy (101) as shown in FIG. 1. The retention policy includes a time period for backup system audit trail files (BSATF) to be kept on the database prior to deletion. The retention policy also includes retention policy exclusions that indicate whether a BSATF should be kept after the time period has passed. The BSATF and the database may be the BSATF (115) and the database (110) as shown in FIG. 1. The retention policy may be set by a user of the database in accordance with specific needs of the user.

In step 202, an audit trail file is selected from the audit trail files. Audit trail files are generated on the database when systems interact with the database. Multiple systems may cause the generation of multiple types of audit trail files on the database. Each audit trail file is separately selected to manage all the audit trail files.

In step 204, a determination is made about whether the audit trail file is one of the BSATF. As discussed above, multiple types of audit trail files exist on the database. The audit trail file is determined to be a BSATF or another system audit trail file. The determination is performed by an audit trail file analyzer of the backup system. The audit trail file analyzer may be the audit trail file analyzer (103) as shown in FIG. 1. The audit trail file analyzer determines if a signature exists on the audit trail file that identifies it as being formed in response to a process of the backup system. The backup system causes the signature, which is unique to audit trail files formed in response to interaction of the backup system and the database. The presence of a signature means the audit trail file is a BSATF. If the audit trail file is a BSATF, the method proceeds to step 206. If the audit trail file is not a BSATF, the method ends and the audit trail file is not deleted.

In step 206, a determination is made about whether the age of the backup system audit trail makes it eligible for deletion. The audit trail file analyzer determines the age of the audit trail file. The age is determined by looking at metafile data of the audit trail file. Once the age is determined, the age is compared to the time period set in the retention policy. If the age is greater than the time period, the audit trail file is eligible for deletion. If the age is less than the time period, then audit trail file is not eligible for deletion. If the backup system audit trail file is eligible for deletion, the method proceeds to step 208. If the backup system audit trail file is not eligible for deletion, the method ends and the audit trail file is not deleted.

In step 208, a determination is made about whether one of the retention policy exclusions are present. The audit trail file analyzer analyzes the audit trail file to determine if one of the retention policies apply. The contents of the audit trail file may indicate that the file should not be deleted. For example, the audit trail file may contain error information such as an error indicating that not all data was backed up during a backup or the last backup was a failed backup. This information is valuable to operations to the database meaning the audit trail file should be kept after the time period has elapsed such as until a new backup without an error is completed. In another example, the metadata of the audit trail file may indicate that the file should not be deleted. The metadata of the audit trail file indicates the process that led to the generation of the audit trail file. If the process that generated the audit trail file is ongoing on the database, the audit trail file should be kept past the time period until at least the process that generated the audit trail file is concluded. In another example, the process may have properties indicated by the user of the client that necessitate a longer time period for keeping the audit trail file such as regulatory mandates for certain businesses. Therefore, the audit trail files should be kept passed the time period. Other retention policy exclusions may exist similar to the ones listed above. The user may set these exclusions on the backup system via the client. The retention policy exclusions safeguard against the loss of crucial data. If one of the retention policy exclusions are present, the method proceeds to step 210. If one of the retention policy exclusions is present, the method ends and the audit trail file is not deleted.

In step 210, the audit trail file is deleted. The backup system accesses and deletes the audit trail file on the database via the connection and deletes the audit trail file. In another embodiment, the audit trail file is marked for deletion and then deletion can be implemented as part of a normal operation of the backup system on the database, minimizing any potential impact on system performance of the database. The deletion frees up space on the database. After step 210, the method ends.

After the method ends, the method may be repeated for a second audit trail file. The second audit trail file may be deleted or not deleted. The method may then be repeated for all audit trail files present in the database. In one or more embodiments of the invention, the audit trail files are continuously managed (i.e., audit trail files are continuously selected to check for eligibility for deletion). In one or more embodiments of the invention, the audit trail files are managed on a scheduled basis (i.e., the audit trail files are selected to check for eligibility for deletion every day, week or month). The user via the client may set the schedule for monitoring the audit trail files.

After a set period of time, an audit trail file that had been selected for the method but not deleted might be selected again to determine if it can now be deleted. For example, an audit trail file that was not deleted because the age was less than the time period might be selected again to determine if the age is now greater than the time period. An audit trail file that was not deleted because one of the retention policy exclusions was present might be selected again to determine if the retention policy exclusion no longer applies and that the audit trail file may be deleted.

The retention policy is customizable and can be modified by the user via the client. As the method is performed for multiple audit trail files, data on the performance of the database may be collected. This data shows the memory usage of the database. If the memory usage of the database is effecting performance of the database, the user may decrease the time period in the retention policy to remove more audit trail files and reduce the audit trail files effect on the memory. The user may also increase the time period or change the retention policy exceptions (i.e., modify, add, or delete the retention policy exceptions). The backup system can be set up to continuously monitor the effectiveness of the retention policy and its impact on system memory and performance of the database. Based on these observations, the retention policy can be adjusted for optimal results by a program set to make adjustments or the user via the client.

As discussed above, embodiments of the invention may be implemented using computing devices. FIG. 3 shows a diagram of a computing device in accordance with one or more embodiments of the invention. The computing device may include one or more computer processor(s) (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the processor(s) (302) may be an integrated circuit for processing instructions. For example, the computer processor(s) may be one or more cores or micro-cores of a processor. The computing device may also include one or more input devices (310), such as a touchscreen, keyboard, mouse, microphone, touchpad, electronic pen, or any other type of input device. Further, the communication interface (312) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the invention, the computing device may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the invention disclosed herein and the invention should not be limited only to solving the same/similar problems. The disclosed invention is broadly applicable to address a range of problems beyond those discussed herein.

Specific embodiments are described with reference to the accompanying figures. In the above description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the prior description of the figures, any component described with regard to a figure, in various embodiments of the invention, may be equivalent to one or more like-named components described with regard to any other figure. For brevity, descriptions of these components are not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing audit trail files on a database, comprising:
    setting up a retention policy for backup system audit trail files in a backup system connected to the database, wherein the audit trail files comprise the backup system audit trail files and other audit trail files;
    after setting up the retention policy:
        making a first determination that a first audit trail file is a backup system audit trail file;
        based on the first determination, making a second determination that an age of the first audit trail file is passed a time period specified in the retention policy;
        based on the second determination, making a third determination that no retention policy exclusion applies to the first audit trail file, wherein the retention policy specifies at least one retention policy exclusion;
        based on the third determination, deleting the first audit trail file from the database;
        making, after deleting the first audit trail file, a fourth determination that a second audit trail file is a second backup system audit trail file;
        based on the fourth determination, making a fifth determination that a second age of the second audit trail file has exceeded the time period specified in the retention policy;
        based on the fifth determination, making a sixth determination that a retention policy exclusion applies to the second audit trail file;
        based on the sixth determination, maintaining the second audit trail file on the database; and
        monitoring, after maintaining the second audit trail file, a memory usage of the database for adjustments to the retention policy by a program of the backup system.

2. The method of claim 1, wherein the first audit trail file is generated based on an interaction between a backup system and the database.

3. The method of claim 2, wherein at least one of the other audit trail files is generated based on an interaction between a production host and the database, wherein an application is executing on the production host and the database stores application data generated by the application.

4. The method of claim 1, wherein the retention policy exclusion specifies that the second audit trail file is not to be deleted when the second audit trail file is associated with an ongoing operation of the database.

5. The method of claim 1, wherein the retention policy exclusion specifies that the second audit trail file is not to be deleted when the second audit trail file is associated with a failed backup on a backup system.

6. The method of claim 1, wherein the time period is determined by a user of the database and a backup system.

7. The method of claim 1, making the first determination that the first audit trail file is the backup system audit trail file comprises determining that the first audit trail file comprises a unique signature.

8. A non-transitory computer readable medium comprising computer readable program code, which when executed by a computer processor enables the computer processor to perform a method for managing audit trail files on a database, the method comprising:
    setting up a retention policy for backup system audit trail files in a backup system connected to the database, wherein the audit trail files comprise the backup system audit trail files and other audit trail files;
    after setting up the retention policy:
        making a first determination that a first audit trail file is a backup system audit trail file;
        based on the first determination, making a second determination that an age of the first audit trail file is passed a time period specified in the retention policy;
        based on the second determination, making a third determination that no retention policy exclusion applies to the first audit trail file, wherein the retention policy specifies at least one retention policy exclusion;
        based on the third determination, deleting the first audit trail file from the database;
        making, after deleting the first audit trail file, a fourth determination that a second audit trail file is a second backup system audit trail file;
        based on the fourth determination, making a fifth determination that a second age of the second audit trail file has exceeded the time period specified in the retention policy;
        based on the fifth determination, making a sixth determination that a retention policy exclusion applies to the second audit trail file;
        based on the sixth determination, maintaining the second audit trail file on the database; and
        monitoring, after maintaining the second audit trail file, a memory usage of the database for adjustments to the retention policy by a program of the backup system.

9. The non-transitory computer readable medium of claim 8, wherein the first audit trail file is generated based on an interaction between a backup system and the database.

10. The non-transitory computer readable medium of claim 9, wherein at least one of the other audit trail files is generated based on an interaction between a production host and the database, wherein an application is executing on the production host and the database stores application data generated by the application.

11. The non-transitory computer readable medium of claim 8, wherein the retention policy exclusion specifies that the second audit trail file is not to be deleted when the second audit trail file is associated with an ongoing operation of the database.

12. The non-transitory computer readable medium of claim 8, wherein the retention policy exclusion specifies that the second audit trail file is not to be deleted when the second audit trail file is associated with a failed backup on a backup system.

13. The non-transitory computer readable medium of claim 8, wherein the time period is determined by a user of the database and a backup system.

14. The non-transitory computer readable medium of claim 8, making the first determination that the first audit trail file is the backup system audit trail file comprises determining that the first audit trail file comprises a unique signature.

15. A system for managing audit trail files, comprising:
a database; and
a backup system connected to the database and comprising a processor and a memory, the processor programmed to complete the following steps stored on the memory:
set up a retention policy for backup system audit trail files, wherein the audit trail files comprise the backup system audit trail files and other audit trail files;
after setting up the retention policy:
make a first determination that a first audit trail file is a backup system audit trail file;
based on the first determination, make a second determination that an age of the first audit trail file is passed a time period specified in the retention policy;
based on the second determination, make a third determination that no retention policy exclusion applies to the first audit trail file, wherein the retention policy specifies at least one retention policy exclusion;

based on the third determination, delete the first audit trail file from the database;
make, after deleting the first audit trail file, a fourth determination that a second audit trail file is a second backup system audit trail file;
based on the fourth determination, make a fifth determination that a second age of the second audit trail file has exceeded the time period specified in the retention policy;
based on the fifth determination, make a sixth determination that a retention policy exclusion applies to the second audit trail file;
based on the sixth determination, maintain the second audit trail file on the database; and
monitor, after maintaining the second audit trail file, a memory usage of the database for adjustments to the retention policy by a program of the backup system.

16. The system of claim 15, wherein the first audit trail file is generated based on an interaction between the backup system and the database.

17. The system of claim 16, wherein at least one of the other audit trail files is generated based on an interaction between a production host and the database, wherein an application is executing on the production host and the database stores application data generated by the application.

* * * * *